United States Patent [19]
Weng

[11] Patent Number: 5,090,369
[45] Date of Patent: Feb. 25, 1992

[54] HEAT-ABSORBING/HEATING DEVICE WITH HIGH EFFICIENCY AND A SUPPORTING DEVICE THEREFOR

[76] Inventor: Yung J. Weng, 3F. NO. 77, Jenai Street, Chung Ho City, Taiwan

[21] Appl. No.: 600,580

[22] Filed: Oct. 18, 1990

[51] Int. Cl.⁵ ............................................. F22B 9/00
[52] U.S. Cl. ................... 122/44.2; 122/155.2; 122/367.3; 126/99 D; 165/179; 165/109.1
[58] Field of Search ............... 122/44.2, 155.2, 367.2, 122/367.3; 126/99 D, 110 R; 165/179, 109.1

[56] References Cited

U.S. PATENT DOCUMENTS

| | | | |
|---|---|---|---|
| 641,911 | 1/1900 | Wilkins et al. | 122/367.2 |
| 1,048,186 | 12/1912 | Lomschakow | 122/367.2 |
| 2,244,800 | 6/1941 | Pascale | 122/367.2 |
| 2,362,571 | 11/1944 | McCollum | 165/179 |
| 3,503,439 | 3/1970 | Wanka et al. | 165/109.1 |
| 3,817,219 | 6/1974 | Sweet | 122/367.2 |
| 4,344,479 | 8/1982 | Bailey | 165/109.1 |
| 4,657,074 | 4/1987 | Tomita et al. | 165/179 |

Primary Examiner—Carroll B. Dority
Attorney, Agent, or Firm—Larson and Taylor

[57] ABSTRACT

A heat-absorbing/heating device with high efficiency and a supporting device thereof, wherein a plurality of spaced heat-absorbing members are disposed on a heat-absorbing surface of the heat-absorbing/heating device and a plurality of space heating members are disposed on a heating surface thereof, and a heat-surrounding member with heat-guiding members is disposed around the heat-absorbing members whereby when heating the heat-absorbing members, the heat-absorbing members can rapidly absorb and collect the heat at high efficiency and conduct the heat to the heating members for further heating the liquid or food contained in the heating-absorbing/heating device, and wherein the supporting device includes a large support portion and a small support portion corresponding to the heat-absorbing-/heating device whereby when heating, the heat-absorbing/heating device can be placed on the supporting device.

6 Claims, 11 Drawing Sheets

Fig. 24-1        Fig. 24-2

HEAT-ABSORBING/HEATING DEVICE WITH HIGH EFFICIENCY AND A SUPPORTING DEVICE THEREFOR

BACKGROUND OF THE INVENTION

The present invention relates to a heat-absorbing-/heating device and a supporting device therefor, and more particularly to a heat-absorbing/heating device which can work at high efficiency and a supporting device corresponding thereto.

Energy-saving has become a very important subject of scientific research in modern life. Therefore, how to increase thermal efficiency when heating liquid, such as water, or food contained in a container appears to be an important problem which needs to be immediately solved.

In U.S. Pat. No. 1,390,783, Carl Hearing disclosures a cooking utensil provided with a large number of small lugs to distribute over substantially the entire extent of the bottom of the cooking utensil for increasing thermal efficiency. However, such cooking utensil can hardly be placed on and heated by any heating device, for example, a gas oven, due to the particular shape of the long lugs. Moreover the lugs are so long that hot burning gas is apt to disperse from the clearances between these long lugs.

In U.S. Pat. No. 2,014,931, William discloses a cooking utensil having a series of radial ribs formed on the bottom thereof and extending up the sides and integral therewith for helping retain the heat to the bottom surface. Such utensil must be used with a stove having a deep burner opening, or on a coal stove where the cover has been removed and the utensil is inserted through the top to get it nearer the fire.

As a consequence, the radial ribs can only retain the heat to the bottom of the utensil without high efficiency heat-absorbing function, and furthermore, such cooking utensil is limited to be used with a stove so that wide application thereof is impossible.

While U.S. Pat. No. 2,554,412, James discloses a cooking utensil provided with depending ribs serving to reinforce the bottom of the cooking utensil and increase the heat-absorbing area. However, such depending ribs are spaced from one another by a long distance so that the heat-absorbing area can be only slightly increased. Moreover, the hot burning gas is easy to escape from the room between these ribs, and such cooking utensil can not be placed stably on a heating device, such as a gas oven, due to the projecting ribs.

The above-mentioned three types of cooking utensils all can only work at low efficiency and hardly cooperate with general gas ovens or other heating devices, and a cooking utensil which can work at high efficiency and a specific supporting device enabling the cooking utensil to be widely used with all kinds of gas ovens or other heating devices are required to save energy and consequently reduce exhausted gas to lower the extend of air pollution.

It is therefore tried by the applicant to develop a heat-absorbing/heating device which can work at high efficiency and a supporting device therefor.

SUMMARY OF THE INVENTION

It is an object of this invention to provide a heat-absorbing/heating device which can work at high efficiency and a supporting device therefor, wherein a plurality of spaced heat-absorbing members are disposed on a heat-absorbing surface of the heat-absorbing-/heating device and a plurality of space heating members are disposed on a heating surface thereof whereby when heating the heat-absorbing members, the heat-absorbing members can for further heating the liquid or food contained in the heat-absorbing/heating device. As a result, the fuel and gas can be saved and produced exhausted gas is reduced to thus lower the extent of air pollution. The heat-absorbing/heating device of this invention can be a cooker, a pitcher, a pan, a boiler, a water heater, a solar energy water heater, a distiller, etc.

The present invention can be best understood through the following description with reference to the accompanying drawings wherein:

BRIEF DESCRIPTION OF THE DRAWINGS

FIG. 1 is a side elevation of a pan with the heat-absorbing plates;

FIG. 1-1 is a top view according to FIG. 1;

FIG. 7 is a side sectional view of a frying pan with the heat-absorbing plates;

FIG. 7-1 is a top view according to FIG. 7;

FIG. 7-2 shows an assembly formed by a cooker, a cooker support and a gas oven;

FIG. 8 is a side sectional view of an electric pitcher with the heat-absorbing plates;

FIG. 9 is a top view of an integrated cooker support;

FIG. 10 is a side sectional view according to FIG. 9;

FIG. 11 is a side sectional view of assembled large and small cooker supports;

FIG. 12 is a top view according to FIG. 11;

FIGS. 13 and 13-1 are top view of the large cooker supports;

FIGS. 14 and 14-1 are top views of the small cooker supports;

FIG. 20-1 is a front elevation according to FIG. 20, showing the arrangement of the smoke pipes and gas in-coming sequence;

FIGS. 20-2 to 20-4 show the smoke pipes provided with the heat-absorbing plates;

FIG. 21-1 is a front sectional view according to FIG. 21;

FIGS. 21-2 and 21-3 show the smoke passages provided with the heat-absorbing plates;

FIG. 22-1 is a front sectional view according to FIG. 22;

FIGS. 22-2 to 22-4 are side sectional views of the smoke pipes provided with the heat-absorbing plates;

FIG. 23-1 show the water pipes in the smoke passages provided outer heat-absorbing plates and inner heating plates;

FIGS. 24-1 and 24-2 show two smoke passages provided with the heat-absorbing plates and heating plates.

DETAILED DESCRIPTION OF THE PREFERRED EMBODIMENTS

Please first refer to FIGS. 1 to 7, wherein several cookers and pans are shown. A plurality of spaced heat-absorbing members 3 are disposed on lower and side surfaces of the cookers and pans. Since the total heat-absorbing area of such spaced heat-absorbing members 3 is much larger then that of a plane bottom and lateral wall, therefore the heat-absorbing efficiency can be greatly increased to save gas and shorten the cooking time. Moreover, the heat-absorbing members 3 on lateral wall of the cooker 1 face the heat source so that the hot burning gas will be restricted by the heat-absorbing members 3 to move inward without flowing outward. Therefore, the lateral heat-absorbing members 3 have the function of guiding gas flow besides the heat-absorbing function.

A heat-surrounding annular plates 15 is disposed around the cooker 1 so as to prevent the hot burning gas from dispersing outward and prevent the ambient cold air from blowing off the hot burning gas between the heat absorbing members. On inner surface of the heat-surrounding annular plate 15 are disposed heat-guiding members 4 face upward so as to guide the hot gas toward the heat-absorbing members 3 on lateral wall of the cooker 1 to increase the thermal efficiency.

Figures 1, 11:
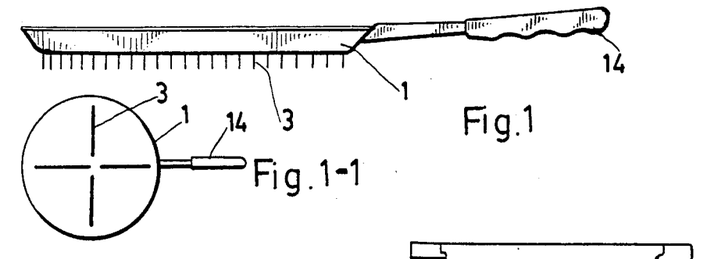
Figure 2:
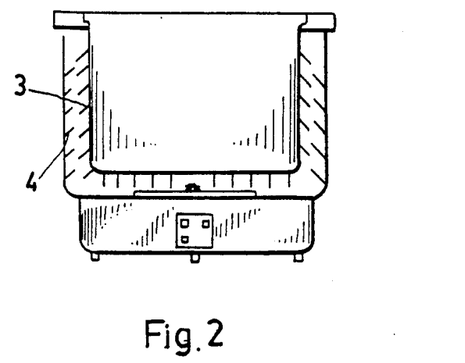
FIG. 2 is a side sectional view of a gas cooker with the heat-absorbing plates.
Figure 3:
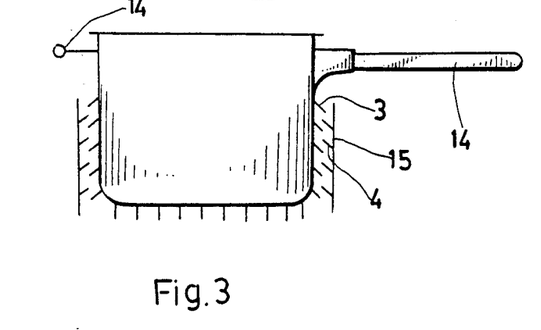
FIG. 3 is a side sectional view of a fast cooker with the heat-absorbing plates.
Figure 4:
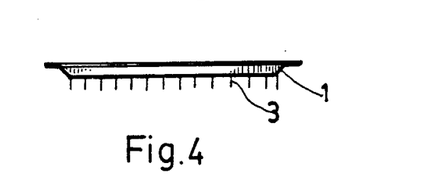
FIG. 4 is a side elevation of an iron pan with the heat-absorbing plates.
Figure 5:
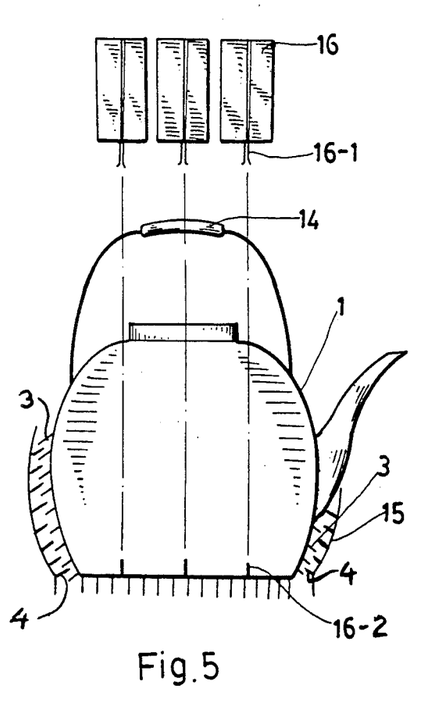
FIG. 5 is a side sectional view of a pitcher with the heat-absorbing plates.
Figure 6:
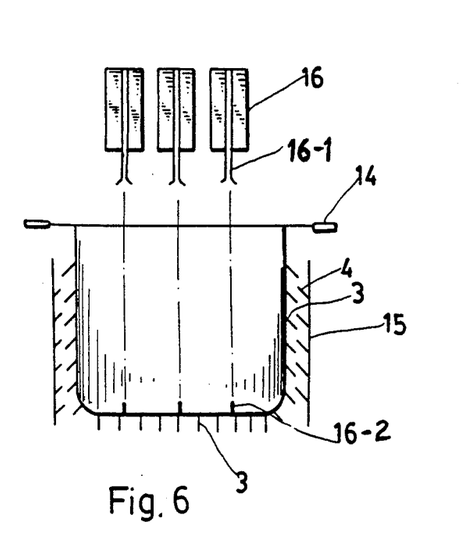
FIG. 6 is a side sectional view of a boiler with the heat-absorbing plates.

In the pitcher of FIG. 5 and boiler of FIG. 6 are disposed fixed heating members 16-2 so that when used, several movable heating members 16 can connect therewith via clips 16-1 formed at lower end of the movable heating members 16. When cleaning the boiler or pitcher, the movable heating members 16 can be removed.

Figures 7, 8, 9, 10, 11, 12, 13, 71, 72, 131:
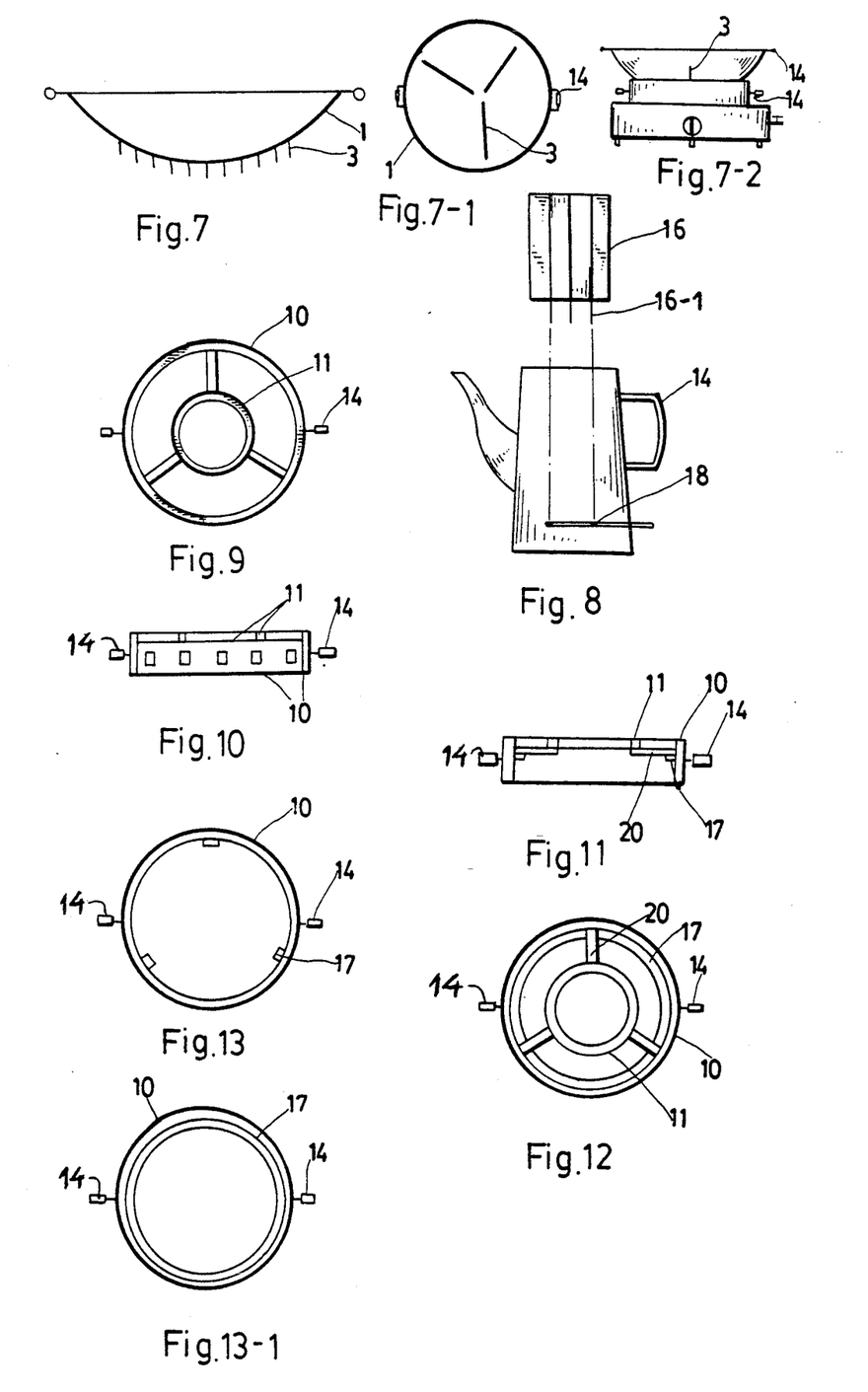

In FIG. 8, inside an electrical pitcher, the clips 16-1 of the movable heating members 16 clamp an electrical heating members 18 whereby when the pitcher is powered on, the heating members 16 can enlarge the contact area of the heating liquid so as to increase the thermal efficiency.

Please now refer to FIGS. 9 to 19 wherein several cooker supports corresponding to the above cookers and boilers are shown FIGS. 9 and 10 show an integrated cooker support having a large support 10 for large cooker and a small support 11 for small cooker. FIGS. 11 to 19 show disassembled cooker supports, composed of a large support 10 and a small support 11.

Figure 15:
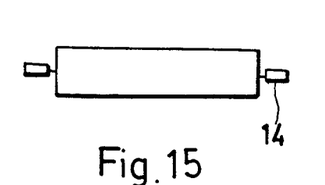
FIG. 15 is a side elevation of a large cooker support with plane upper surface and without vent hole.
Figure 16:
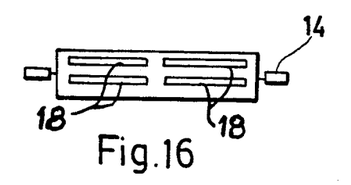
FIG. 16 is a side elevation of a large cooker support with plane upper surface and vent holes.
Figure 17:
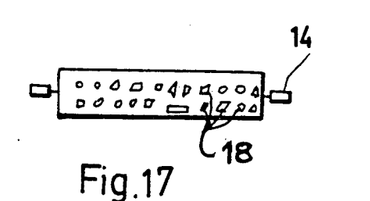
FIG. 17 is a side elevation of a large cooker support with plane upper surface and vent holes.
Figure 18:
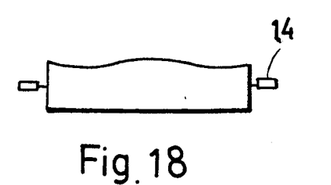
FIG. 18 is a side elevation of a large cooker support with waved upper surface and without vent hole.
Figure 19:
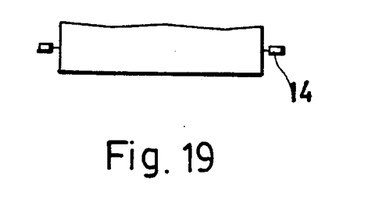
FIG. 19 is a side elevation of a large cooker support with waved upper surface and without vent hole.
Figure 20:
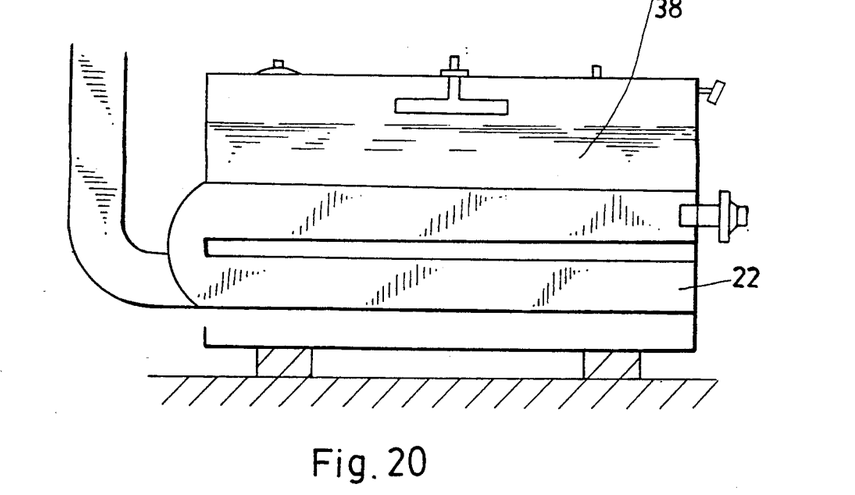
FIG. 20 is a side sectional view of a five-circulation boiler.
Figure 21:
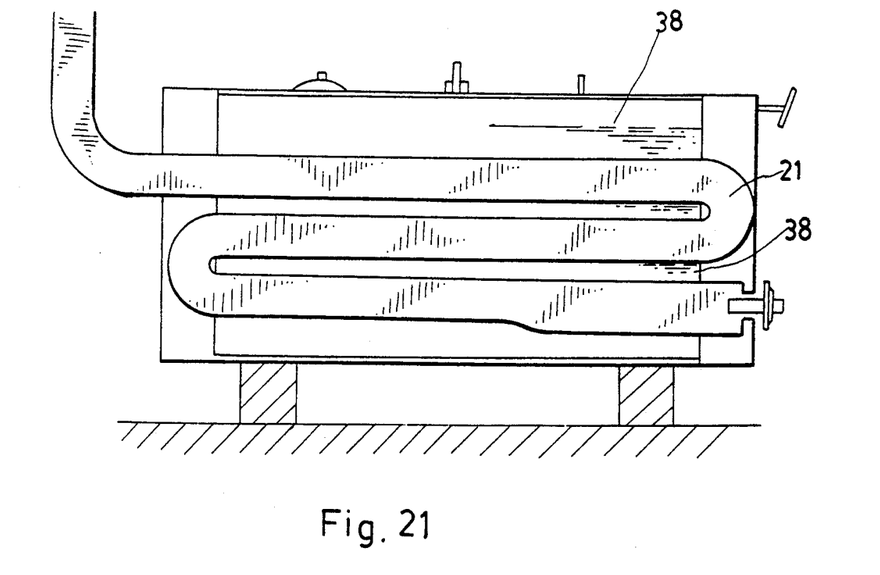
FIG. 21 is a side sectional view of a three circulation boiler.
Figure 22:
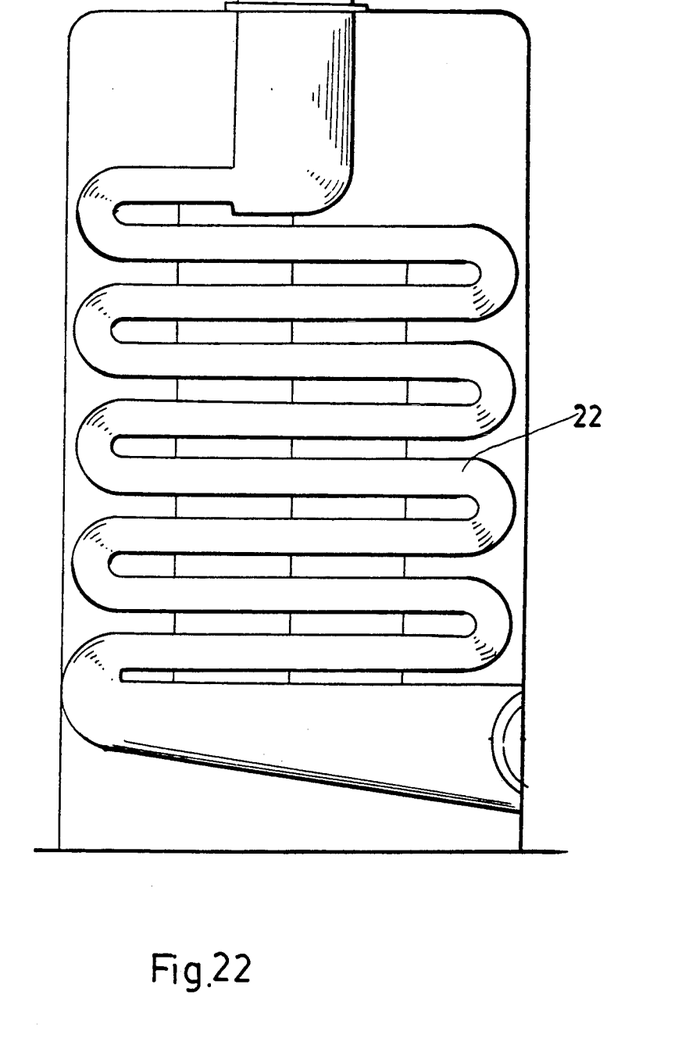
FIG. 22 is a side sectional view of a vertical boiler with horizontal smoke pipes.
Figure 23:
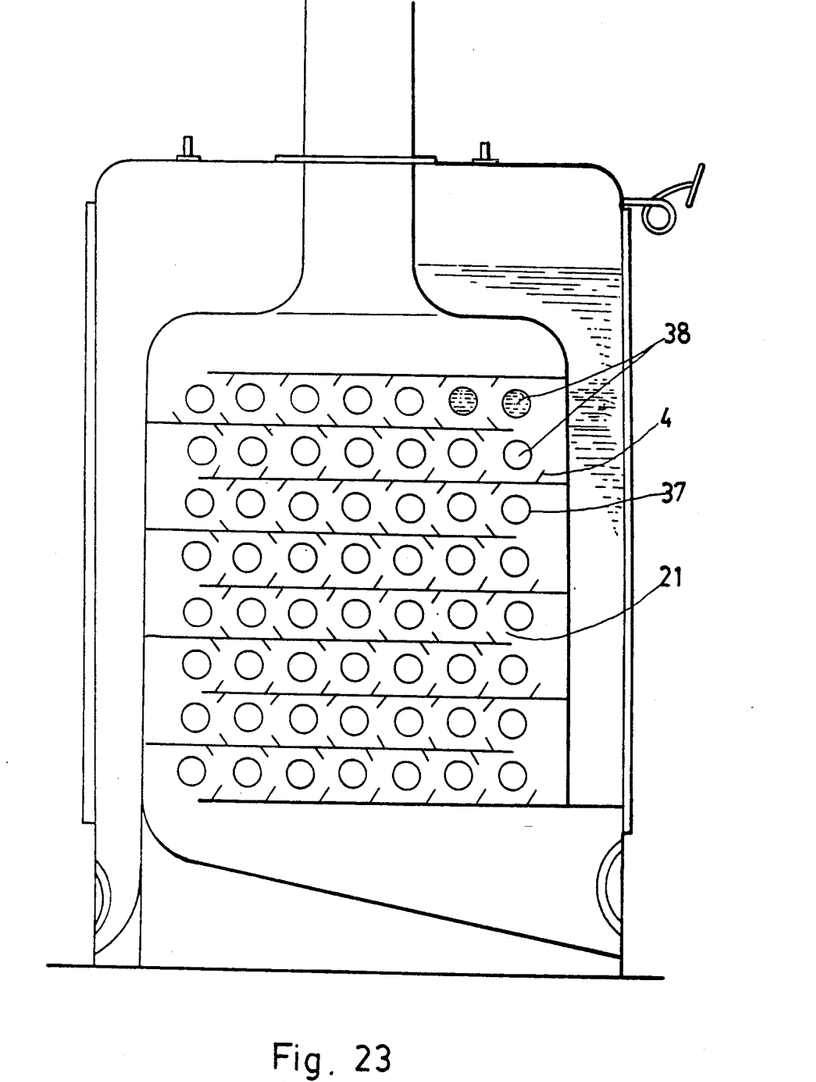
FIG. 23 is a side sectional view of a vertical boiler with horizontal smoke passages.
Figure 24:
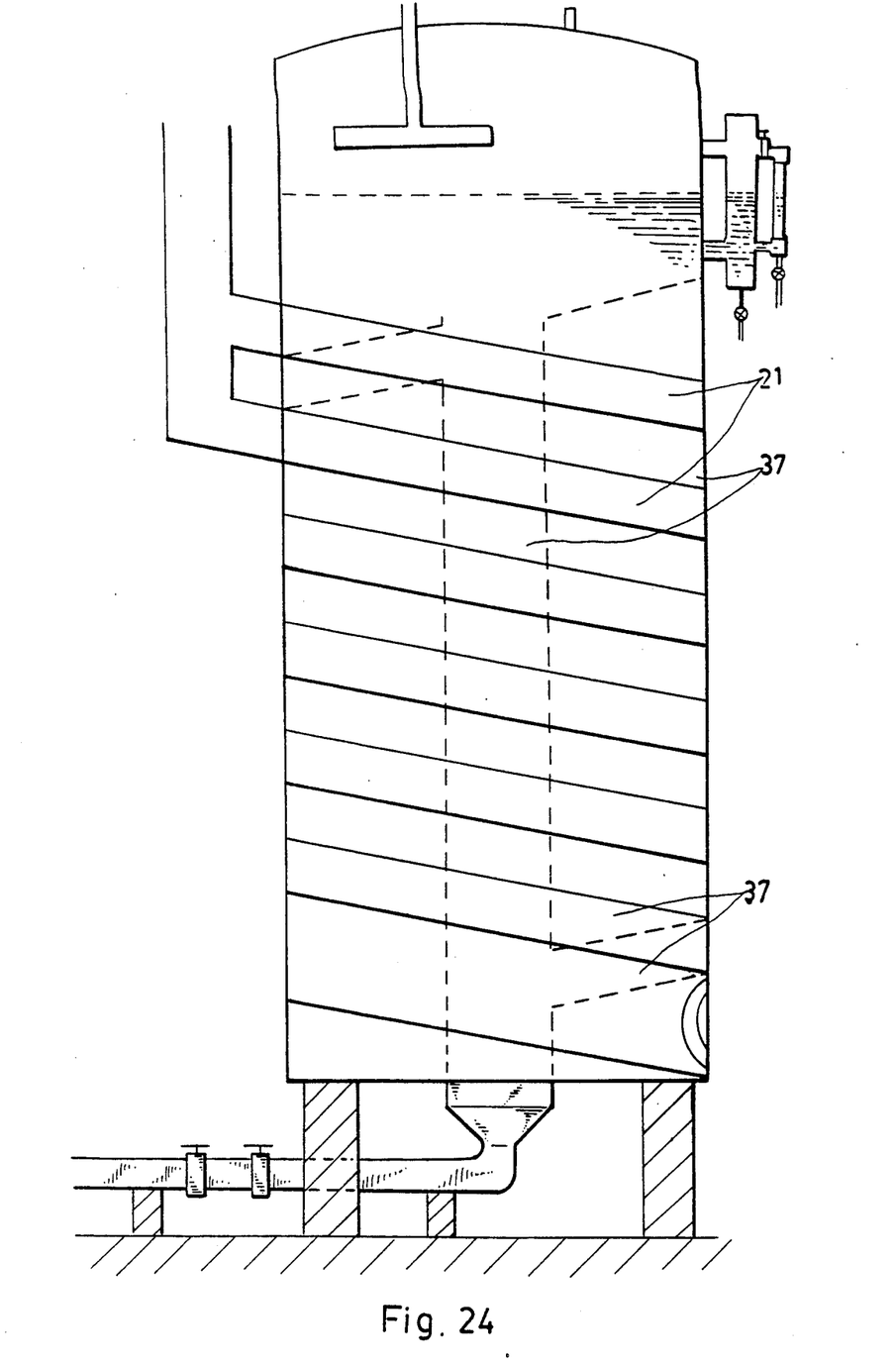
FIG. 24 is a longitudinal sectional view of a boiler with through flow smoke pipes.

The upper surfaces of the large and small cooker supports 10, 11 can be plane as shown in FIGS. 15 to 17, waved as shown in FIGS. 18 and 19, or be a mixed form including plane portion and waved portion. The top elevation of the cooker support can be circular, polygonal or wavealy circular or a mixed form.

Figure 14:
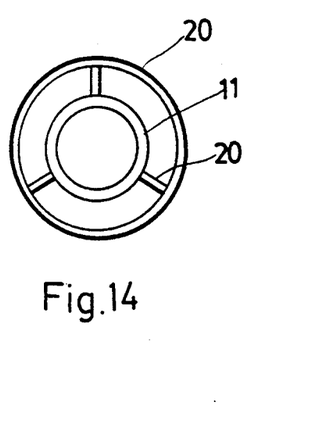

In FIGS. 13 and 13-1, along inner circumference of the large cooker support and below the top thereof is formed projecting portions 17 serving as a bracket for placing the small cooker support having legs 20 shown in FIGS. 14 and 14-1.

As show in FIGS. 15 to 19, the side walls of the cooker supports can be formed with vent holes 18 or without vent hole. The shapes of the vent holes can be widely modified. In addition, handle devices 14 can be disposed on two sides of the cooker supports. The above-mentioned cooker supports also serve to shade the heat-absorbing members from wind to retain the heat therein.

The cookers and cooker supports of this invention should be used together without departure. The cookers of this invention can be used on a conventional support of a gas over and the convertional cookers can not be used on the cooker supports of this invention.

Referring to FIGS. 20 to 24, several kinds of boilers and water heaters are shown. On outer surfaces of the smoke passages 21 and smoke pipes 22 are dispossed multiple spaced heat-absorbing members 3 and on inner surfaces thereof are also disposed multiple heating members 16 whereby when heating the heat-absorbing members 3 of the smoke passages 21 or smoke pipes 22, since the total heat-absorbing area of such heat-absorbing members is much greater than that of a smooth outer surface of the smoke passages 21 or smoke pipes 22, and the total area of such heating members 16 is much greater than a smooth inner surface therefor, therefore the heat-absorbing members can rapidly collect the thermal energy and conduct the energy to the heating members 16 for further rapidly heating the liquid contained therein. According to the above arrangement, the thermal efficiency can be increased and gas or fuel can be saved and the operation time can be shortened.

The heat-absorbing members 3 disposed on outer surfaces of the smoke passages 21 and smoke pipes 22 face the smoke passages 21 and smoke pipes 22 face the heat source whereby when hot burning gas is blown inward, the heat-absorbing members 3 will guide the hot burning gas toward, the inner heat-absorbing surface of the smoke passage 21 and smoke pipe 22 without flowing away.

Figure 204:
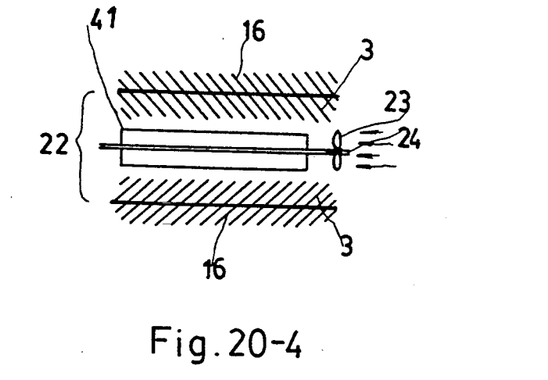
Figure 211:
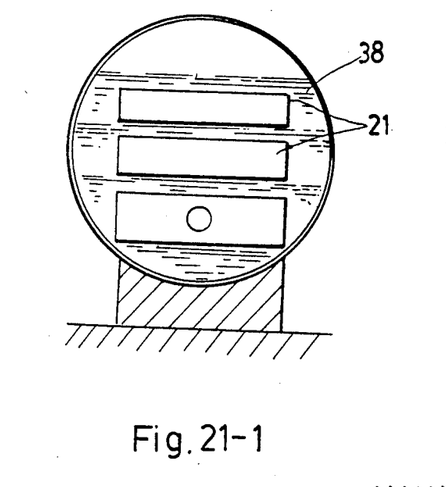
Figure 212:
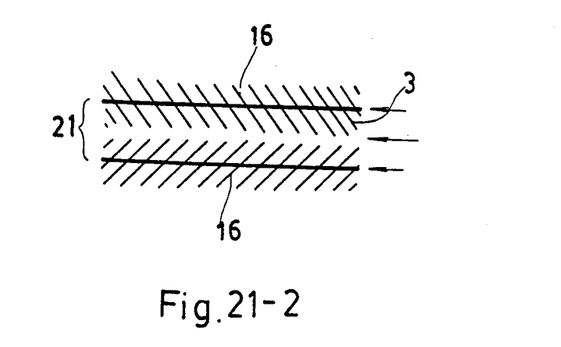
Figure 213:
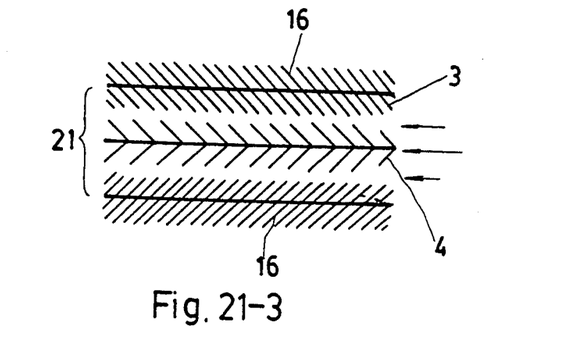
Figure 221:
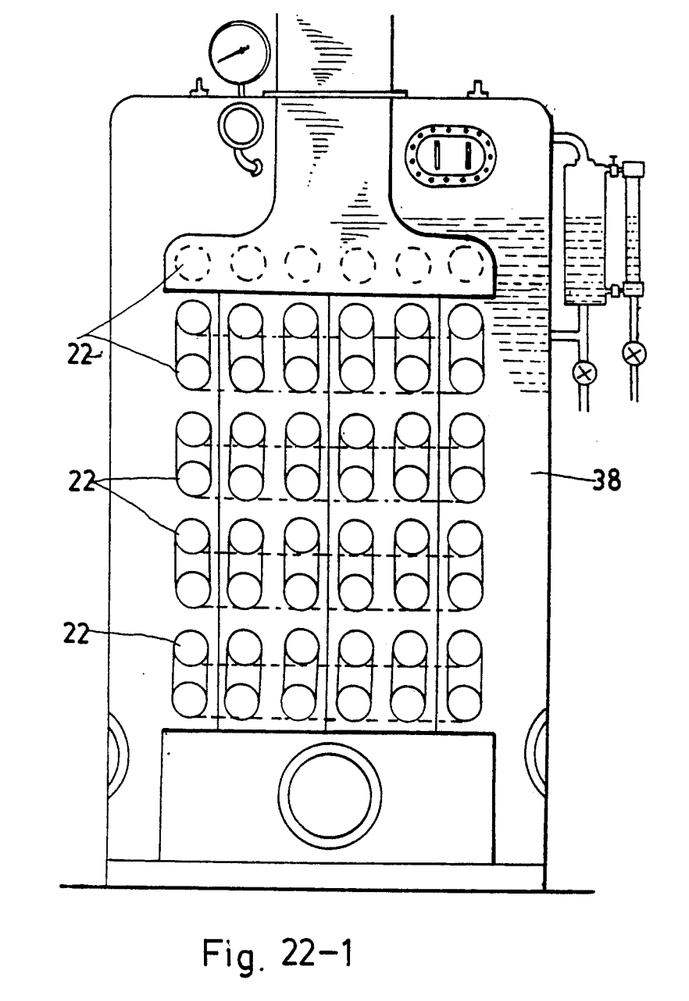
Figures 222, 223, 224:
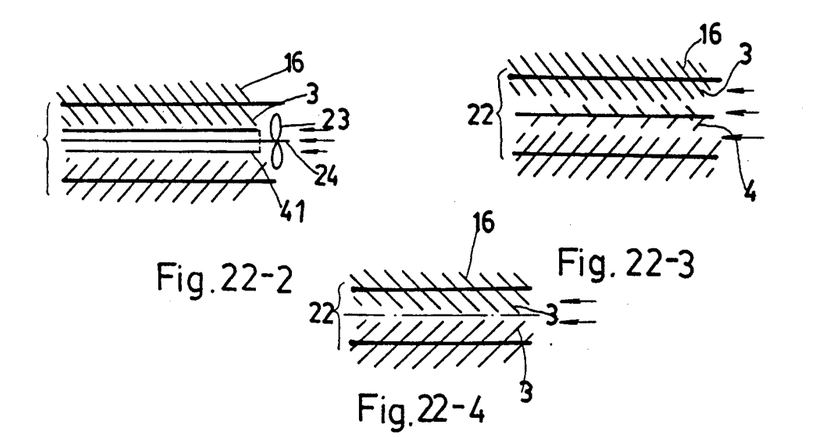
Figure 231:
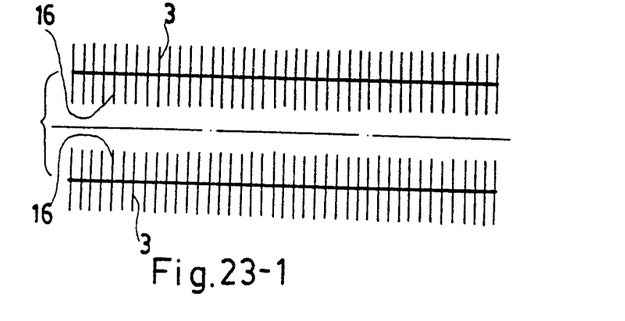
Figure 241:
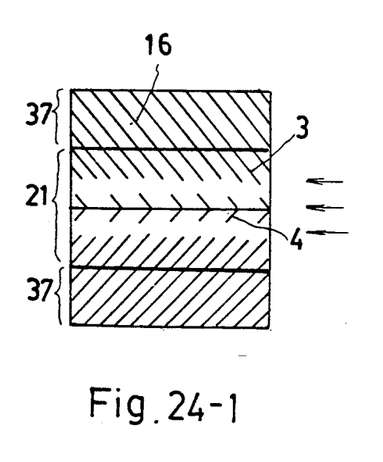
Figure 242:
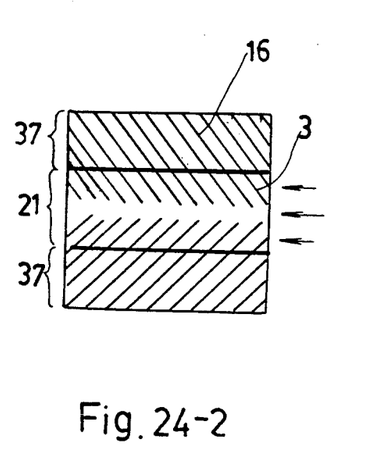

In FIGS. 20-4 and 22-2, fan member 23 and rotary shaft 24 are used to rotate a heat-guiding plate 41 and blow the hot gas into the heat-absorbing members 3.

Figure 25:
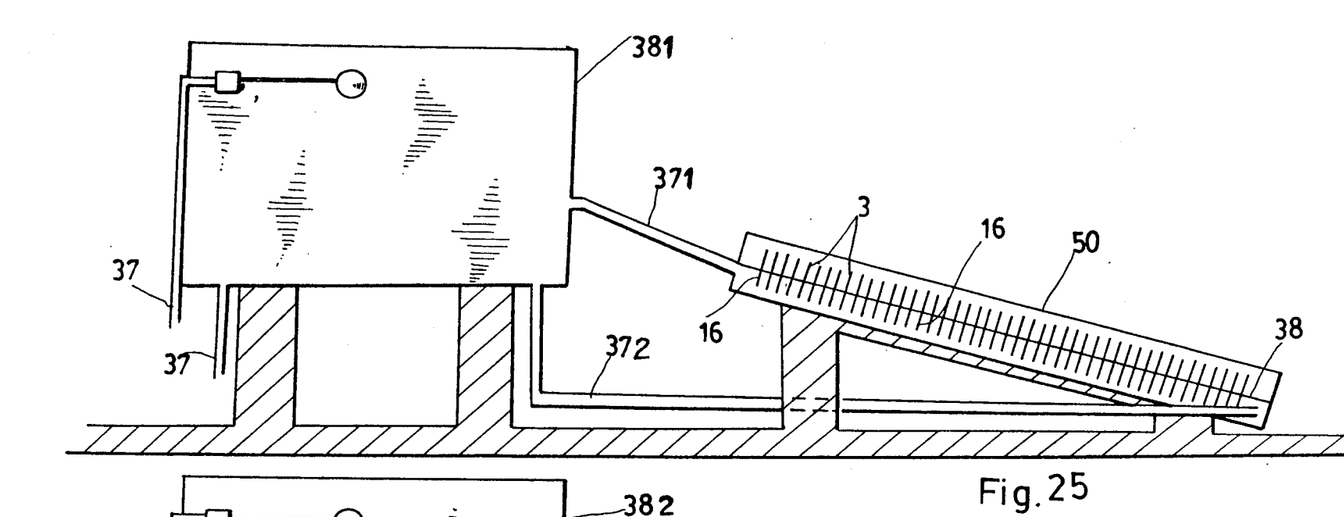
FIGS. 25 and 26 are side sectional views of solar energy water-heaters provided with heat-absorbing plates.
Figure 26:
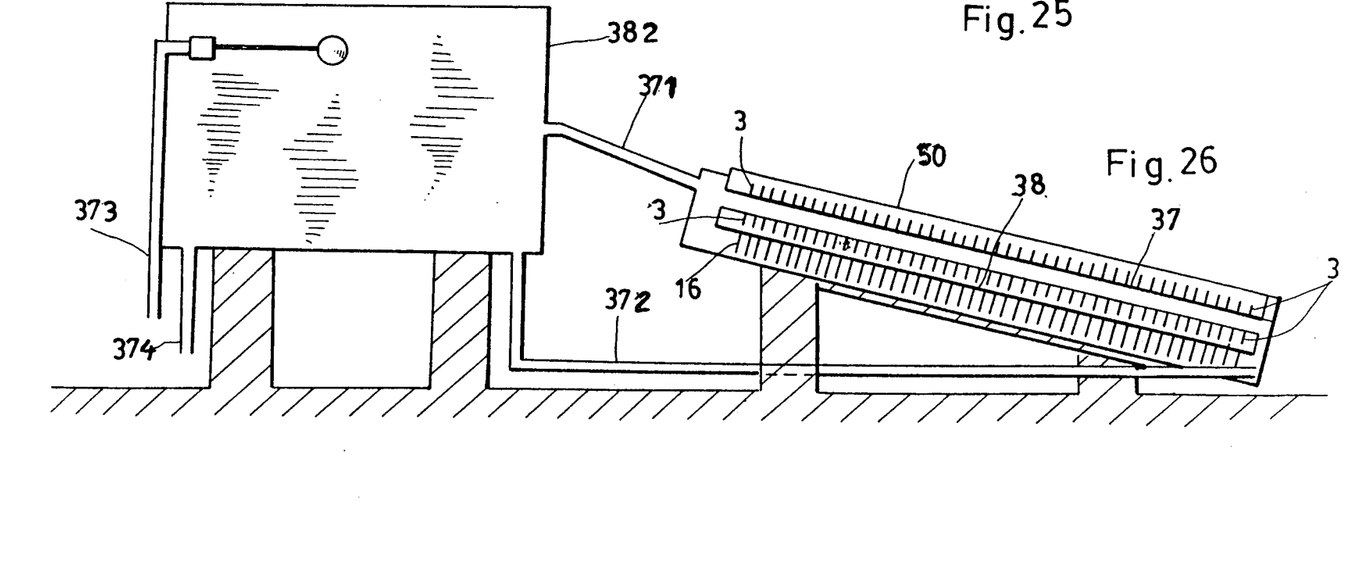
Figure 141:
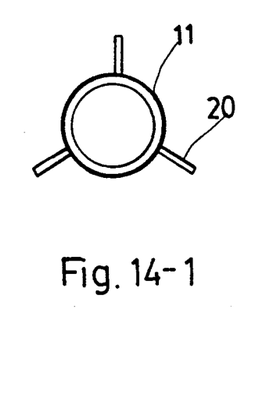
Figure 201:
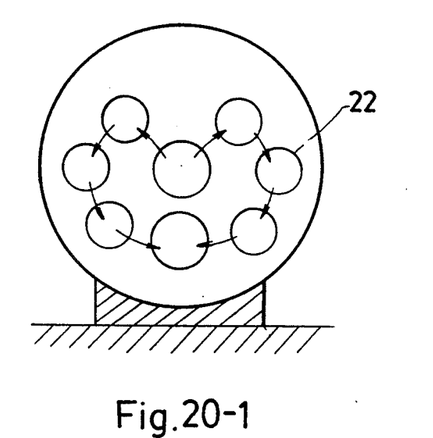
Figure 202:
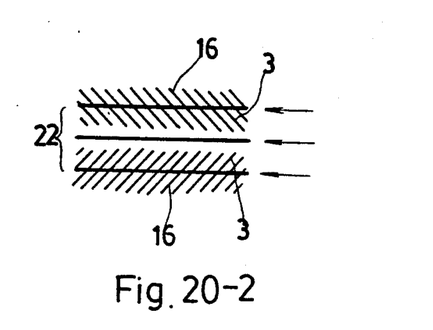
Figure 203:
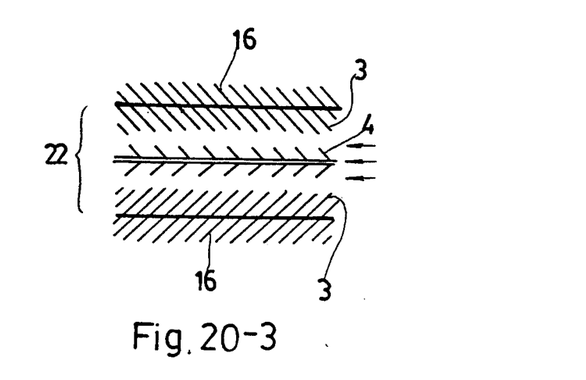

FIGS. 25 and 26 show a solar energy water heater wherein when the solar energy water heater is exposed to the sun light, greenhouse effect will occur under the high pressure glass 50 to heat the heat-absorbing members 3 which then conduct heat to the heating members 16 which contact with and heat the water contained in a water tanks 381,382.

In FIG. 26, an upper cover of the thin water tank 382 not only can serve as a heat-absorbing member to conduct heat to the heating members 16 and the water in the water tank 382, but also can reflect sun light toward the heat-absorbing members 3 under multiple spaced water pipes on the water tank 382 so as to conduct heat to the water in the water pipe 37. The heated water will flow upward into a big water tank 381,382 through a water pipe 371 while the cold water in lower portion of the big water tank 381,382 will flow downward to the lower end of the solar energy water heater through a water pipe 372. Water pipe 373 connects with a water source and water pipe 374 connects with a bath room and a kitchen.

I claim:

1. A heat-absorbing/heating means and supporting means with high efficiency and having a heat-absorbing surface and a heating surface to be heated by a hot fluid, comprising supporting means for supporting said heat-absorbing-/heating means;

a plurality of spaced heating-absorbing members disposed on said heat-absorbing surface; and a plurality of spaced heating members disposed on said heating surface;

wherein said heat-absorbing/heating means is a boiler having several smoke passages, and on the inner surface of said smoke passages are disposed said plurality of spaced heat-absorbing members, and a rotary shaft provided with a fan and multiple heat-guiding members is disposed in said smoke passage so that said fan can rotate to blow hot gas and air toward said heat-absorbing members, and a fixed rod member is disposed in said smoke passage, and multiple spaced heat-guiding members are disposed on said fixed rod member to guide the hot gas and air toward said heat-absorbing members in said smoke passage.

2. A heat-absorbing/heating means with high efficiency, such as a boiler, and having a heat-absorbing surface and a heating surface to be heated by a hot fluid, comprising supporting means for supporting said heat-absorbing-/heating means;

several heated fluid conduits having hot fluids flowing therethrough for heating;

a plurality of spaced heating-absorbing members disposed on said heat-absorbing surface and comprising multiple spaced heat-absorbing members on the inner surfaces of said conduits;

a plurality of spaced heating members disposed on said heating surface; and a rotary shaft provided with a fan disposed in at least one of said conduits so that said fan can rotate to blow hot fluids toward said heat-absorbing member.

3. The heat-absorbing/heating means as claimed in claim 2 wherein said surface is a smoke passage or smoke pipe of a boiler.

4. The heat-absorbing/heating means as claimed in claim 2 and further including multiple heat-guiding members mounted on said shaft to guide the hot fluids toward said heat-absorbing members in said conduit.

5. The heat-absorbing/heating means as claimed in claim 2 and further including a fixed rod member disposed in at least one of said conduits, and multiple spaced heat-guiding members disposed on said fixed rod member to guide the hot fluids toward said heat-absorbing members in said conduit.

6. A heat-absorbing/heating means with high efficiency, such as a boiler, utilizing hot fluids for heating and having a heat-absorbing surface and a heating surface to be heated by a hot fluid, comprising several hot fluid conduits;

supporting means for supporting said heat-absorbing-/heating means;

a plurality of spaced heating-absorbing members disposed on said heat-absorbing surface, said heating-absorbing members comprising multiple spaced heat-absorbing members disposed on the inner surface of said conduits;

a plurality of spaced heating members disposed on said heating surface; and a rotary shaft provided with a fan and multiple heat-guiding members disposed in at least one of said conduits so that said fan can rotate to blow hot fluids toward said heat-absorbing members, and a fixed rod member disposed in at least one of said conduits, and multiple spaced heat-guiding members are disposed on said fixed rod member to guide the hot fluids toward said heat-absorbing members in said conduit.

* * * * *